Dec. 23, 1969   W. C. SMITH ET AL   3,485,740
GLASS ELECTRODE STRUCTURE
Filed March 17, 1967
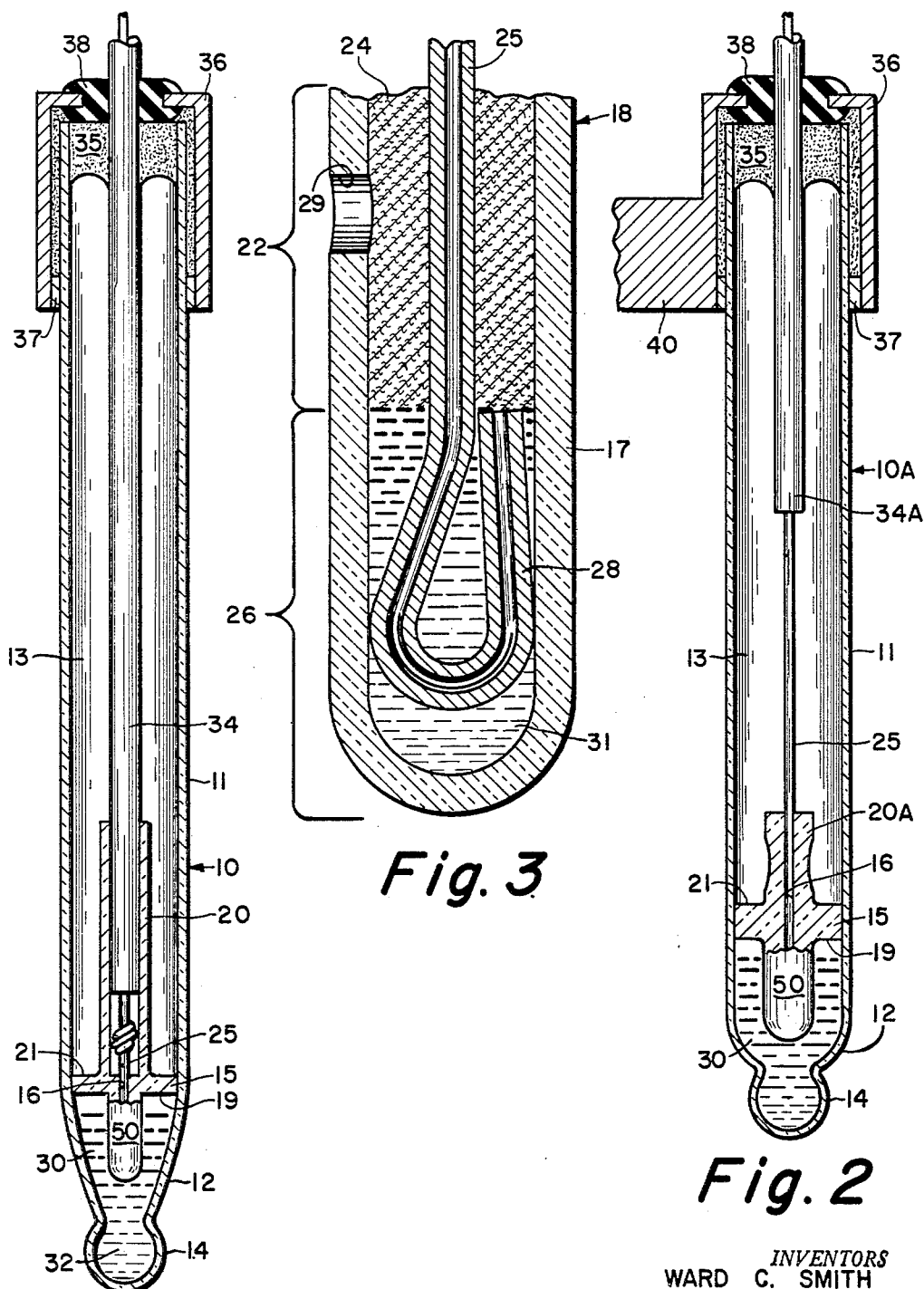
INVENTORS
WARD C. SMITH
RAYMOND L. SOUZA
BY
ATTORNEY 3,485,740
GLASS ELECTRODE STRUCTURE
Ward C. Smith, Medfield, and Raymond L. Souza, Woburn, Mass., assignors to Corning Glass Works, Corning, N.Y., a corporation of New York
Filed Mar. 17, 1967, Ser. No. 624,064
Int. Cl. B01k 3/04, 3/02
U.S. Cl. 204—195                                2 Claims

ABSTRACT OF THE DISCLOSURE

This invention relates to the design and fabrication of glass electrode structures wherein a hollow tube is utilized as an electrical conductor and passageway for filling the electrode with mercury and electrolyte.

BACKGROUND OF THE INVENTION

Electrochemical devices for the determination of ion concentrations in aqueous solutions are well known. These devices comprise a sensing electrode, a reference electrode, and a potentiometer. The two electrodes are connected to the potentiometer and then immersed in a test solution, such that an electrochemical cell develops. The potential thus created is proportional to the concentration of the ion being tested for.

It is often desired to determine the hydrogen ion concentration, or pH, of a solution. To this end many "pH meters" have been developed which utilize glass electrodes. The Beckman Model "G" is a pH meter which utilizes glass electrodes for such determinations. Two sets of electrodes can be utilized, the first called the external electrodes and the second called the internal electrodes. The internal electrodes are small, on the order of two inches long, and are adapted for use in a small compartment within the meter itself. The external electrodes are larger, on the order of five inches long, and have integral electrical shielding to allow use outside the meter for greater flexibility.

DESCRIPTION OF THE PRIOR ART

Both the external and internal sensing electrodes are essentially a glass tube or stems having a hydrogen ion sensing membrane on one end thereof which is to be immersed in the test solution. A mercury coated platinum wire is coaxially supported inside the tube by an inverted, conically-shaped glass member. The mercury-coated end of the platinum wire is positioned near the inside surface of the ion sensitive membrane. The wire is secured at the apex of the cone etiher by being sealed within the glass or attached with an epoxy resin. The base of the cone is secured to the inside surface of the tube again either by fusion or by epoxy. The inside surface of the tube, the inside surface of the membrane, and the outer surface of the cone form a compartment which is filled with an electrolyte and into which the mercury-coated end of the platinum wire extends. The compartment is filled with a sufficient amount of electrolyte so that the mercury coating is always submerged in the electrolyte. Changes in hydrogen ion concentration are sensed by the membrane, converted to electrical signals, and communicated to the potentiometer through the electrolyte, the mercury, and then the platinum wire.

Several serious problems exist in the present design of the sensing electrode. First, the mercury coating is dissipated during manufacture and operation thereby resulting in unreliable information. Furthermore, the mercury coating is electroplated or dipped onto the wire, which requires that the wire be previously supercleaned in order for the mercury to adhere thereto. If the wire becomes contaminated, for example, with finger prints, the wire must be recleaned before it can be coated. Finally, once the mercury is coated onto the wire, it must not be heated since, having a low boiling point and a low vapor pressure, it will readily volatilize. Loss of metallic mercury to the electrolyte can greatly affect the performance of the electrode and, since there is only a small amount of mercury on the wire, the electrode has a relatively small finite operating life. The above problems are common to both the internal and external designs.

There are other problems which are unique to either the internal or external electrodes. Since the internal electrode is used inside the meter, it is shielded by the meter housing from strong electrical signals which could affect its performance, and, as a result, there is no need to use electrically-shielded wire when fabricating the electrode. Therefore, the supporting cone could be made long, normally on the order of one inch, so that the heat resulting from fusing the base to the tube is removed as far as possible from the mercury-coated end. The steps of fabrication would be to (1) fuse the wire to the apex of the cone, (2) coat the wire with mercury, (3) fill the stem and membrane with electrolyte, (4) support the stem and membrane in a vertical position, (5) insert the cone and wire in the inverted position into the stem and membrane, and (6) fuse the base of the cone to the stem. Several problems are inherent in this method of fabrication. First, the tube and membrane must be supported in a vertical position since there is a liquid contained therein. Second, the electrolyte should be kept as cool as possible, otherwise the electrolyte could be damaged and the mercury could volatilize or oxidize, and, third, as the glass is heated to complete the fusion seal, the gases within the compartment are also heated and can expand so rapidly as to blow out the softened glass at the seal. In order to seal without the use of heat, epoxy resins have been used.

Historically, an all glass seal has been a quality seal and more desirable. Epoxy seals can work well but may be attacked and degraded by the electrolyte in use, and, as a result, possibly introduce unknown contaminants into the electrode which could deleteriously effect its operation. Furthermore, from a quality control point of view, it is more desirable to use glass seals than epoxy seals during manufacture.

Certain other problems have occurred which are unique to the external electrode. Since the external electrode is used outside the meter, it must be shielded as much as possible from outside electrical signals. It would be impractical to shield the outside of the electrode because the shielding would be immersed in the test solution and hence may affect the ion concentration. Therefore, the only desirable alternative is to shield as great a length of wire inside the electrode as possible. However, there are problems associated with using shielded wire as a method of protecting the electrode from extraneous electrical signals. The problem is, essentially, that it is desirable to place the apex of the supporting cone and mercury-coated end as close to the membrane as possible. However, it is likewise desirable to fuse the base of the cone to the inside of the tube as far away from the membrane as possible so that the mercury coating receives as little heat as possible. Therefore, a long tapering cone would be needed and this cone would require sufficiently large internal dimensions so as to accept a shielded wire. Furthermore, since the cone is long, a problem of concentricity and coaxiality with the tube exists. In balancing these factors, a short supporting cone is used and, as a result, a large length of platinum wire is left unshielded. That length extends from the mercury-coated end near the membrane, through the apex of the cone, and for a short distance into the cone.

In order to shield this exposed length of wire, a second, larger-diameter glass tube whose longitudinal axis is coaxial with that of the first tube is fused to the first tube near the membrane end of the electrode. Since the second tube has a larger diameter than the first, there is a tubular space therebetween. This space extends from about the membrane to the opposite end of the electrode. A metallic electrical shield having a tubular shape is then inserted into the tubular space so as to shield the exposed wire. However, there are problems of coaxiality concentricity of the second tube with the first tube and cone. Also, two additional pieces of material (the second tube and shielding) have been introduced and the additional operation of fusing has been added. Until now this has been the only practical method of manufacturing a reliable, electrically-shielded external electrode.

The problem of expanded entrapped gases is present when trying to fuse the base of the supporting cone to the tube but is not as severe as in the internal electrode. However, the electrode still must be held in a vertical position so as to contain the electrolyte during sealing. Again, epoxy was tried as a method of sealing but was not entirely satisfactory for sealing the electrolyte compartment.

It would be desirable to use a design similar to that disclosed in U.S. Patent No. 3,226,313, whereby the maximum length of shielded wire could be obtained and the problem of orientation could be eliminated. This patent discloses constructing an inner assembly comprising an inner glass tube into which a shielded conductor is placed and through the end of which a coated platinum tube extends. The coated end of the platinum tube is immersed in the electrolyte and is electrically connected to the shielded wire inside the inner glass tube. An integral flange or collar on the outside of the tube, and which is perpendicular to the longitudinal axis of the tube, is disposed so that when the inner tube is placed inside the outer tube or stem, the flange slidingly engages the inner surface of the outer tube and may be fused thereto. This design eliminates the problem of orientation in that the inner tube can be fused in the horizontal or vertical position and the electrolyte added after fusing. However, that patent deals with Silver-Silver Chloride electrodes which have a Silver-Silver Chloride coating baked or sintered onto the platinum tube and can, therefore, be heated without concern about vaporization or volatilization. The above design is not satisfactory for mercury electrodes because the mercury will volatilize when heated. Therefore, it is necessary to fill the compartment with electrolyte before fusing in order to keep the mercury cool and to keep the outer tube in the vertical position during fusing.

Since no reliable method has been found to control or prevent the loss of mercury during fabrication and operation, and, because there was only a small amount of mercury present such that any loss of mercury could affect the performance of the electrode, the electrodes of the prior art were unreliable. The electrodes' response would change or drift over short periods of time and the electrodes had a short shelf life. Also, difficulty of shielding in the external electrode further compounded manufacturing problems.

OBJECTS OF THE INVENTION

It is, therefore, the primary object of our invention to make reliable glass sensing electrodes for determining the ionic concentration of solutions.

It is the secondary object of our invention to make such reliable glass sensing electrodes which are easy to fabricate.

BRIEF DESCRIPTION OF THE DRAWING

The following discussion of my invention can be best understood when read in light of the following drawing:

FIGURE 1 is a cross-sectional view of a large external electrode.

FIGURE 2 is a cross-sectional view of the smaller internal electrode.

FIGURE 3 is a cross-sectional view of the assemblage.

DESCRIPTION OF THE PREFERRED EMBODIMENT

The outer appearance and dimensions of the electrodes of our invention are very similar to those of the prior art. However, the internal structure and method of fabrication are uniquely different from that of the prior art. And, as a result of these differences, we have made significantly better electrodes. It will be noted that the electrodes of FIGURE 1 and FIGURE 2 are basically the same except for sizes and slight design modifications which will be pointed out as necessary.

Throughout the following discussion, the same reference numerals will be used in both FIGURE 1 and FIGURE 2 to designate analogous parts.

In the fabrication of the large external electrode 10 or the small internal electrode 10A, two assemblies are fused together. The first assembly consists of an outer tube 11 having a tapering end portion 12 to which a spherically-shaped, ion-sensitive membrane 14 is fused and formed in the standard manner thereby providing a tube-like compartment 13. The slightly different shapes of the tapering end portions 12 in FIGURE 1 and FIGURE 2 are of no effect and are related to the difference in size of the two electrodes. The second assembly consists of a flat circular dividing wall 15 having a small hole or aperture 16 through the wall. The diameter of wall 15 is about the same as the inner diameter of outer tube 11. The cylindrically-shaped, outer wall 17, which is closed at one end forms inner compartment 18. FIGURE 3 is a cross-sectional view of assemblage 50 shown in FIGURES 1 and 2. One end of wall 17 is fused to the inner surface 19 such that the longitudinal axis of the outer wall 17 is substantially coaxial with the longitudinal axis of outer tube 11 and the axis of aperture 16. In making the large external electrode 10, a second glass tube 20 is fused to the outer surface 21 of wall 15 such that the longitudinal axis of the second tube 20 is coaxial with that of aperture 16 and outer wall 17. In the case of the small internal electrode 10A, a small diameter second glass tube 20A, is fused to the outer surface 21 of wall 15 so that the longitudinal axis of tube 20A is coaxial with that of aperture 16 and outer wall 17. It is understood that the preceeding parts of the second assembly can be made from one piece rather than being fabricated of three pieces by fusion.

In the manufacture of this electrode, the upper portion 22 of inner compartment 18 is filled with glass wool 24, which is an inert, glassy, fibrous, heat resistant material. Next, a hollow conductor 25, preferably a platinum tube, which has about the same outer dimension as the inner dimension of aperture 16, is inserted into and through aperture 16, through the glass wool 24 in the upper portion 22 and into the lower portion 26 of inner compartment 18. The hollow conductor end in the lower portion 26 is then reverse bent so as to form a hook 28 whose end is upward but does not extend into the upper portion 22. An opening 29 is provided in wall 17 in the upper portion 22 of inner compartment 18 and adjacent surface 19. The dividing wall 15 is then heated and pressed inwardly so as to form a fluid-tight seal about the hollow conductor 25. In the case of the small internal electrode 10A, tube 20A is also heated and pressed inwardly to aid in forming a fluid-tight seal. Next, an end of wall 17 is heated so that it may be sealed and inner compartment 18 formed. As disclosed in U.S. Patent No. 3,226,313, the second assembly is then placed inside the first assembly wherein the dividing wall 15 slidingly engages the inside surface of outer tube 11. The second assembly is then located at some predetermined distance from the bottom of membrane 14. The dividing wall 15 is fused to the inside of tube 11 thus forming a fluid-tight seal and thereby providing a separate chamber 30 in the end of compartment 13.

The inner compartment 18 and chamber 30 are then evacuated, allowing the gases to escape through the hollow conductor 25. Liquid metal mercury 31 is now drawn through the hollow conductor 25 and into the lower portion 26 of inner compartment 18. The lower portion 26 is substantially filled with mercury 31 so that the hook 28 is submerged in mercury, the top level of the mercury 31 being adjacent to the bottom surface of glass wool 24. Since the glass wool 24 is a very tight but porous structure, the mercury cannot escape through it and then through opening 29 out into chamber 30. Any semipermeable heat resistant material which is relatively impermeable to mercury but permeable to the electrolyte may be used. Once the mercury reaches the desired level, its flow is stopped and the electrolyte is then flowed through the conductor 25 and out of the end of hook 28 which is level with the top of the mercury 31. The electrolyte flows through the glass wool 24 through opening 29 and into the chamber 30. The chamber 30 is almost completely filled with electrolyte 32; however, a small space is left to allow for any thermal expansion of the liquids. Furthermore, the chamber 30 is filled with electrolyte to a level such that the opening 29 is always submerged in the electrolyte which means that the upper portion 22 of inner compartment 18 is always filled with electrolyte. This is important so as to provide electrical communication between the inner surface of membrane 14 and the mercury 31.

After the flow of electrolyte has been stopped, the exposed end of conductor 25 is sealed and then electrically connected to another conductor. The conductor 34 in the case of the external electrode 10 is shielded, and in the small internal electrode 10A, the conductor 34A is unshielded. Conductor 34 rests in the second glass tube 20 which acts as a housing and guide in the external electrode 10.

The assemblage 50 comprising the above-stated components constitutes the crux of our invention and FIGURE 3 illustrates the preferred embodiment of such an assemblage.

Housing 35 through which conductors 34 and 34A pass, are provided at the upper end of tube 11. The housing 35 is comprised of a cap 36, a gasket 38 which fits inside an opening in cap 36 and rests on the upper end of tube 11, and a cylindrical spacer 37 which maintains a space between the cap 36 and outside of tube 11. The conductors 34 and 34A are secured to the inside of tube 11 by an epoxy resin and the cap 36, gasket 38 and spacer 37 are secured to the outside surface of tube 11 by an epoxy resin. The cap 36 of the internal electrode 10A has an integral handle or projection 40 which is adapted to fit a mating piece inside the compartment in the Beckman Model G pH meter.

A particular advantage of our improved electrodes is that they contain more mercury after fabrication than prior electrodes. This is because the mercury is added after all the heating and glass working operations are completed and because there is a large inner compartment into which more mercury can be pooled than can be put onto a wire as a coating. Since there is more mercury, some loss thereof through dissipation will not affect the performance as greatly as if there were less total mercury.

Furthermore, in the case of the external electrode, there is a manufacturing advantage in using a conventional shielded wire as opposed to other more elaborate shielding techniques.

The third significant advantage of this design is that all the glass working can be done before any liquids are added, which means there are no problems of volatilization, orientation, or entrapped gases.

We claim:
1. A glass electrode for determining ionic concentrations in an aqueous solution comprising:
   a first glass tube having an ion sensitive membrane sealed across one end thereof, and a liquid electrolyte contained within said tube,
   a second glass tube sealed at one end so as to form a chamber, said second tube being disposed within and attached by a glass to glass seal to said first tube,
   an inert hollow metal conductor having one end extending through said seal into said chamber, said conductor having a hooked portion at said end disposed in an upward direction, and
   metallic mercury contained within said chamber and in direct contact with said metal conductor.
2. The electrode of claim 1, wherein said chamber is divided into an upper portion and a lower portion, said hollow conductor extending into said lower portion and said mercury substantially filling said lower portion, said upper portion containing a heat resistant glass wool member, said member being permeated with the electrolyte and said upper portion having an opening to form a liquid bridge between the electrolyte in the chamber and in said first tube.

References Cited

UNITED STATES PATENTS

| | | | |
|---|---|---|---|
| 2,340,642 | 2/1944 | Cameron | 204—195.1 |
| 2,697,070 | 12/1954 | Arthur | 204—195.1 |
| 3,226,313 | 12/1965 | Riseman | 204—195.1 |

JOHN H. MACK, Primary Examiner

T. TUNG, Assistant Examiner.